UNITED STATES PATENT OFFICE.

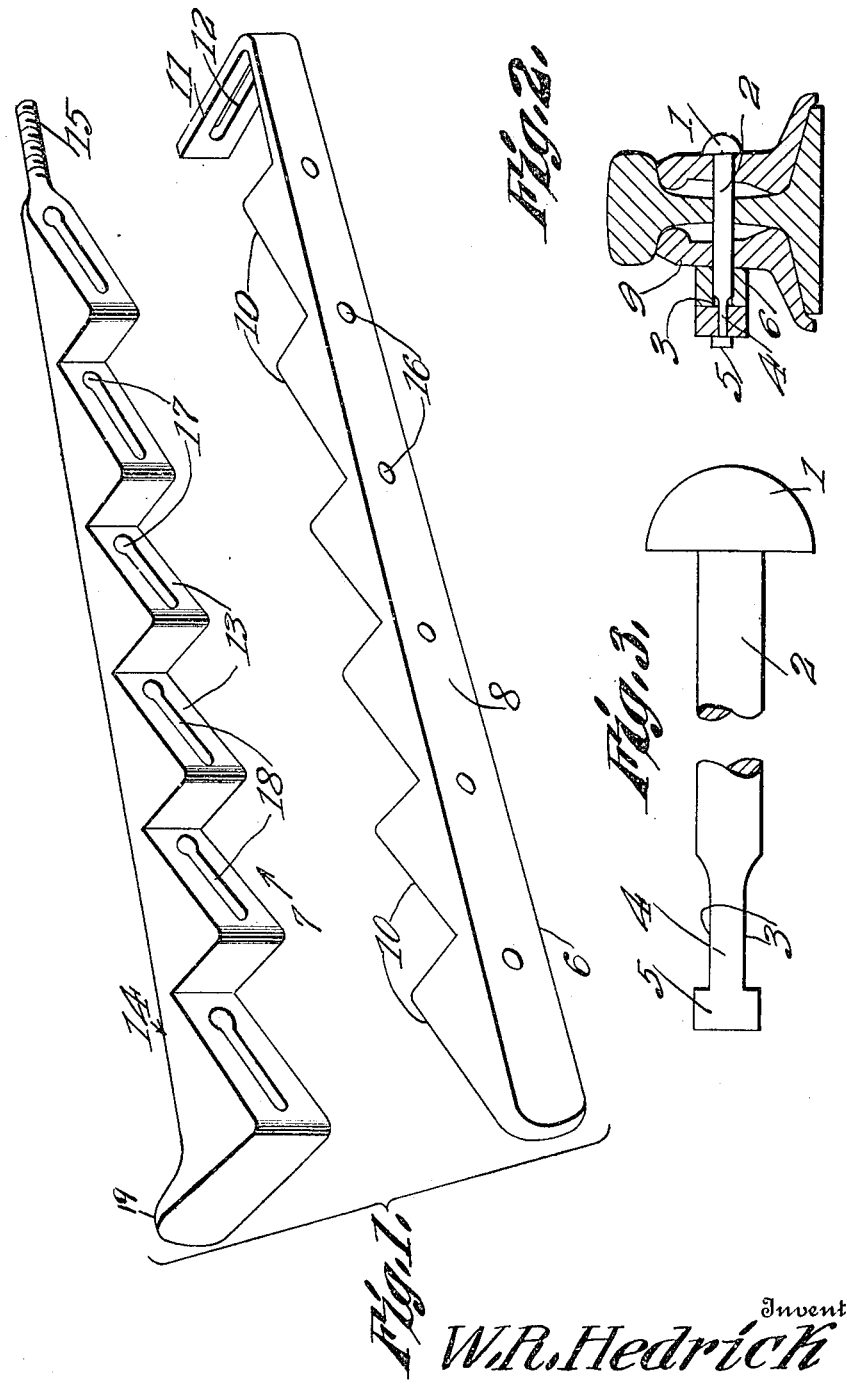

WILLIAM RUFUS HEDRICK, OF ROANOKE, VIRGINIA.

THREADLESS BOLT.

1,256,227.  Specification of Letters Patent.  Patented Feb. 12, 1918.

Application filed June 8, 1917. Serial No. 173,634.

*To all whom it may concern:*

Be it known that I, WILLIAM RUFUS HEDRICK, a citizen of the United States, residing at Roanoke, in the county of Roanoke and State of Virginia, have invented a new and useful Threadless Bolt, of which the following is a specification.

The subject of this invention is a threadless bolt which may be used for connecting any parts, but which I have designed principally for connecting the rails of a railway.

The main object of the invention is to provide a bolt which may be tightened in its place without the use of a screw threaded nut for each bolt.

Another object is to provide means whereby a series of bolts may be tightened by a single operation.

Another object is to provide a bolt connection which is unlikely to work loose from the agitation of the rails.

Still another object is to provide a simple and efficient bolt of the character set forth.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

A practical embodiment of the invention is shown in the accompanying drawing, wherein:

Figure 1 is a perspective view of the tightening bars showing the same separated.

Fig. 2 is a vertical cross section showing the device in place on a railway rail.

Fig. 3 is a view in elevation of the bolt, a central portion broken away.

Referring to the drawing by numerals:

The bolt is formed with the usual head 1 and shank 2, but instead of the usual threads being formed on the shank, two opposed depressions 3 are provided which extend for a short distance longitudinally of the shank and form a web 4 which connects the main portion of the shank with the end or button 5.

The locking device consists of two coöperating bars indicated generally at 6 and 7. The bar 6 is formed with a flat face 8 which is adapted to engage the surface of the object through which the bolts project, in the present instance the fish plate 9. The opposite face of the bar is formed with a series of longitudinally inclined faces 10. At one end the bar 6 is angled to form the extending arm 11, in which is provided a slot 12. The bar 7 is formed with a series of inclined faces 13 adapted to the faces 10, the opposite face 14 of the bar presenting a straight surface. At one end of the bar 7 is formed an extending finger 15 which is adapted to the slot 12 and threaded to receive a nut, not shown. The bar 6 is provided with a series of bores 16, which are adapted to aline with the cylindrical heads 17 of a series of key hole slots formed in the bar 7. The attenuated portion 18 of each key hole slot is adapted to receive the web 4 of the bolt.

The bar 14 is formed, at the end opposite that from which the finger 15 projects, with an anvil 19 which is provided for the purpose of separating the bars and loosening the bolts.

In practice the device is used as follows: The bolts are inserted through the openings in the fish plates and rails. The bars 6 and 7 are placed with their inclined faces contacting and placed in position with the bolts extending through the bores 16 and cylindrical openings 17. The end 5 of each bolt will then extend slightly beyond the flat face 14 of the bar 7. A nut may now be threaded on the finger 15, which is extended through the slot 12, and brought against the arm 11, causing the bar 7 to be drawn along the bar 6 and, because of the inclination of the contacting faces, wedge the face 14 against the ends 5 of the bolts. It will be understood that, as the bar 7 slides along the bar 6, the web 4 of each bolt will enter its attenuated slot 18.

Having thus described my invention, what I claim as new and desire to secure by Letters Patent, is:

1. A threadless bolt, comprising a shank provided with depressions, a head on the shank, and a fastening means for the bolt consisting of a bar having an inclined face and provided with a bore for the reception of the shank, another bar provided with a key hole slot and an inclined face adapted to the face of the first bar, means for drawing the second bar along the first bar to tighten the bolt, and an anvil extending from the second bar and adapted to be struck to separate the bars and release the bolt.

2. A threadless bolt, comprising a shank provided with depressions, a head on the shank, and a fastening means for the bolt consisting of a bar having an inclined face and provided with a bore for the reception of the shank, there being an outturned end on the bar provided with a slot, another bar provided with a key hole slot and an inclined face adapted to the face of the first bar, there being a reduced threaded end on said latter bar adapted to pass through the slot in the end of the first bar to draw the second bar along the first bar and tighten the bolt, and an anvil outstanding from the other end of the second bar.

In testimony that I claim the foregoing as my own, I have hereto affixed my signature in the presence of two witnesses.

WILLIAM RUFUS HEDRICK.

Witnesses:
C. A. JENNINGS,
W. D. DEW.

Copies of this patent may be obtained for five cents each, by addressing the "Commissioner of Patents, Washington, D. C."